US012689479B2

(12) United States Patent (10) Patent No.: US 12,689,479 B2
Davydov et al. (45) Date of Patent: Jul. 21, 2026

(54) GROUP-BASED CHANNEL STATE INFORMATION REFERENCE SIGNAL (CSI-RS) TRANSMISSION

(71) Applicant: Intel Corporation, Santa Clara, CA (US)

(72) Inventors: Alexei Davydov, Santa Clara, CA (US); Avik Sengupta, San Jose, CA (US); Bishwarup Mondal, San Ramon, CA (US); Guotong Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 18/558,153

(22) PCT Filed: Aug. 31, 2021

(86) PCT No.: PCT/US2021/048522
§ 371 (c)(1),
(2) Date: Oct. 30, 2023

(87) PCT Pub. No.: WO2023/033813
PCT Pub. Date: Mar. 9, 2023

(65) Prior Publication Data
US 2024/0214147 A1 Jun. 27, 2024

(51) Int. Cl.
*H04L 5/00* (2006.01)
*H04W 72/232* (2023.01)
(52) U.S. Cl.
CPC ............ *H04L 5/005* (2013.01); *H04L 5/0053* (2013.01); *H04W 72/232* (2023.01)

(58) Field of Classification Search
CPC ..... H04L 5/0053; H04L 5/005; H04W 72/232
See application file for complete search history.

(56) References Cited

U.S. PATENT DOCUMENTS 10,952,231 B2 * 3/2021 Liou ...................... H04W 72/23
12,309,615 B2 * 5/2025 Franke .................. H04W 72/23
(Continued)

FOREIGN PATENT DOCUMENTS

EP 3849256 A1 7/2021
KR 20180009747 A 1/2018
(Continued)

OTHER PUBLICATIONS

International Patent Office—International Search Report and Written Opinion mailed May 11, 2022, from International Patent Application No. PCT/US2021/048522, 10 pages.
(Continued)

*Primary Examiner* — Abdullah A Riyami
(74) *Attorney, Agent, or Firm* — Gray Ice Higdon, PLLC

(57) ABSTRACT

Systems, apparatuses, methods, and computer-readable media are provided for channel state information (CSI)-reference signal (RS) triggering for multiple user equipments (UEs) using a single downlink control information (DCI). In some embodiments, a new radio network temporary identifier (RNTI) may be used to indicate triggering of CSI-RS transmission for multiple UEs. Additionally, or alternatively, a new DCI format may be used that supports CSI-RS triggering for multiple UEs. The techniques described herein may provide reduced DCI overhead compared with prior techniques. Other embodiments may be described and claimed.

20 Claims, 7 Drawing Sheets

(56) References Cited

U.S. PATENT DOCUMENTS

| | | | | |
|---|---|---|---|---|
| 12,457,074 | B2 * | 10/2025 | Sun | H04B 7/0626 |
| 12,457,536 | B2 * | 10/2025 | Kim | H04W 56/0015 |
| 2019/0089436 | A1 | 3/2019 | Wei et al. | |
| 2019/0327115 | A1 | 10/2019 | Zhang et al. | |
| 2020/0178240 | A1 | 6/2020 | Zhang et al. | |
| 2021/0391906 | A1 * | 12/2021 | Oteri | H04L 5/0048 |

FOREIGN PATENT DOCUMENTS

| | | | | |
|---|---|---|---|---|
| WO | 202049736 | A1 | 3/2020 | |
| WO | 2020146499 | A1 | 7/2020 | |
| WO | WO-2022029691 | A1 * | 2/2022 | H04W 52/42 |
| WO | WO-2025212011 | A1 * | 10/2025 | H04W 52/242 |

OTHER PUBLICATIONS

3GPP, "Technical Specification Group Radio Access Network; NR; Physical layer procedures for data (Release 16)," 3GPP TS 38.214 V16.6.0 (Jun. 2021), 5G, 172 pages.

Huawei, et al., "Maintenance on DL signals and channels for NR Unlicensed," 3GPP TSG RAN WG1 Meeting #104bis-e, R1-2102326, Agenda Item: 7.2.2, Apr. 12-20, 2021, E-meeting, 13 pages.

Japanese Patent Office, Office Action issued in Application No. JP2023-576329, 8 pages, dated Jun. 23, 2025.

Japanese Patent Office, Office Action issued in Application No. JP2023-576329, 11 pages, dated Dec. 16, 2025.

Intel Corporation, Discussion on SRS enhancements [online], 3GPP TSG RAN WG1, Meeting #103-e R1-2008982, Nov. 1, 2020, https://www.3gpp.org/ftp/tsg_ran/WG1_RL1/TSGR1_103-e/Docs/R1-2008982.zip, section 2.1.2.

* cited by examiner (4, 1)

(2, 2)

(2, 1)

receiving, from a gNB, configuration information for a DCI that is to trigger an aperiodic CSI-RS for a plurality of UEs
602 receiving the DCI
604 receiving the aperiodic CSI-RS based on the DCI and the configuration information
606

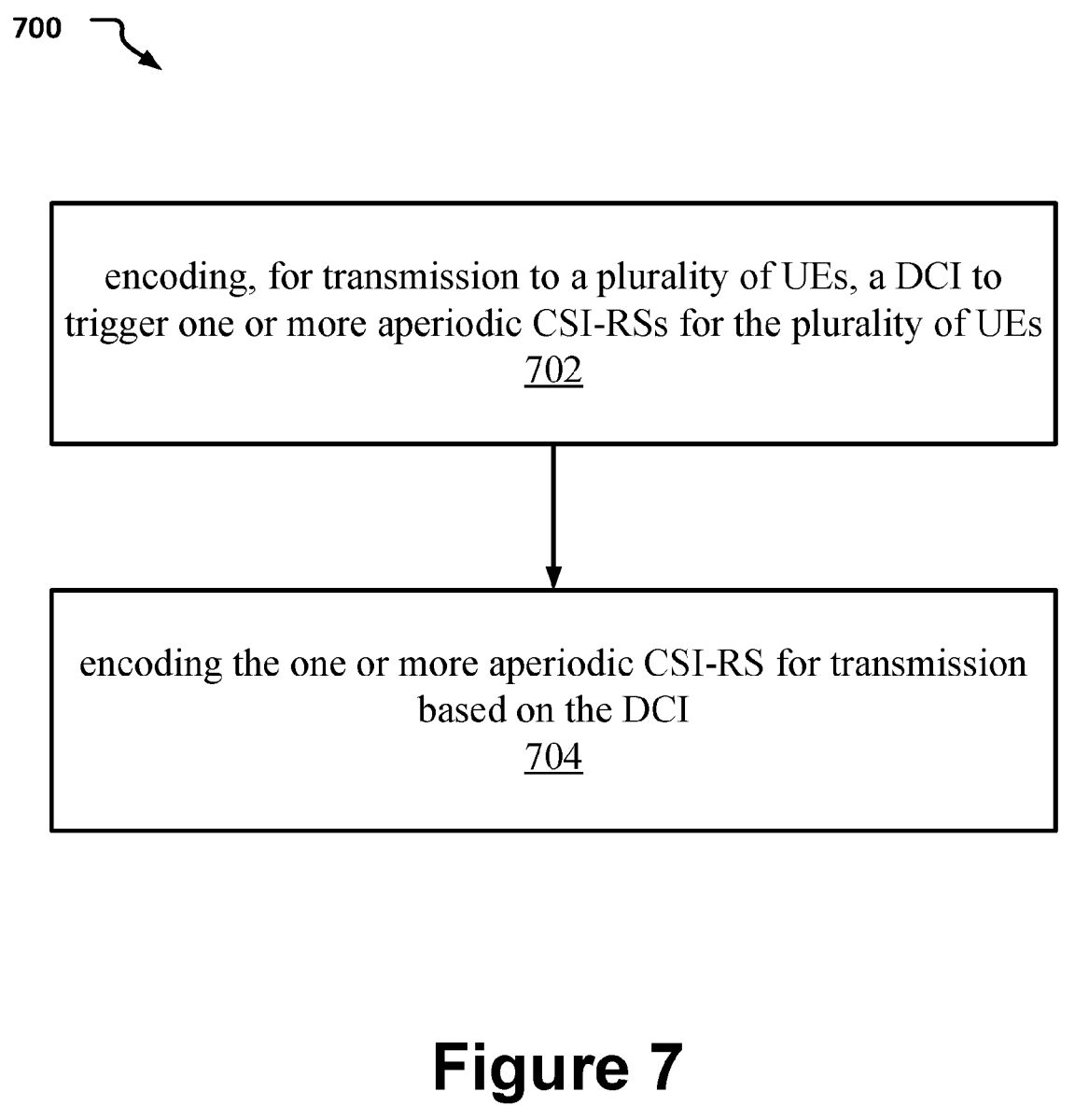

700 encoding, for transmission to a plurality of UEs, a DCI to trigger one or more aperiodic CSI-RSs for the plurality of UEs
702 encoding the one or more aperiodic CSI-RS for transmission based on the DCI
704

Figure 7

GROUP-BASED CHANNEL STATE INFORMATION REFERENCE SIGNAL (CSI-RS) TRANSMISSION

CROSS REFERENCE TO RELATED APPLICATIONS

This application is a national phase entry under 35 U.S.C. § 371 of International Application No. PCT/US2021/048522, filed Apr. 31, 2021, entitled "GROUP-BASED CHANNEL STATE INFORMATION REFERENCE SIGNAL (CSI-RS) TRANSMISSION," the entire disclosure of which is hereby incorporated by reference.

FIELD

Various embodiments generally may relate to the field of wireless communications. For example, some embodiments may relate to techniques for group-based CSI-RS transmission.

BACKGROUND

New Radio (NR) supports channel state information (CSI)-reference signals (RSs) to support channel measurements for CSI reporting and beam management (BM) reporting. There are three types of CSI-RS transmission supported in NR: periodic, semi-persistent, and aperiodic. Periodic CSI-RS is configured by radio resource control (RRC) signaling and periodically transmitted by a next generation NodeB (gNB). Semi-persistent CSI-RS is also configured by RRC, but its periodic transmission is activated by media access control (MAC) signaling. Aperiodic CSI-RS is triggered by downlink control information (DCI) and limited to one or several CSI-RS transmission occasions. Aperiodic CSI-RS is triggered by uplink (UL) DCI formats 0_1 and 0_2 in a user equipment (UE)-specific manner.

BRIEF DESCRIPTION OF THE FIGURES

FIG. 7 depicts another example procedure for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various embodiments herein provide techniques for CSI-RS triggering for multiple UEs using a single DCI. In some embodiments, a new radio network temporary identifier (RNTI) may be used to indicate triggering of CSI-RS transmission for multiple UEs. Additionally, or alternatively, a new DCI format may be used that supports CSI-RS triggering for multiple UEs. The techniques described herein may provide reduced DCI overhead compared with prior techniques.

NR supports CSI-RS to support channel measurements for CSI reporting and beam management (BM) reporting. A CSI-RS resource includes one or more basic units of adjacent elements. For example, the CSI-RS resource may have a size (Y, Z) of adjacent elements, where Y is a number of sub-carriers and Z is a number of orthogonal frequency division multiplexing (OFDM) symbols. Table 1 illustrates supported combinations of basic units and antenna port (AP) multiplexing for CSI-RS resource. CDM refers to code division multiplexing, FD refers to frequency domain (e.g., FD-CDM), and TD refers to time domain.

TABLE 1

Supported combinations of the basic units and antenna port multiplexing for CSI-RS resource

| #AP | Density PRB | N. symb. | (Y, Z) | Multiplexing |
|---|---|---|---|---|
| 1 | 1, ½, 3 | 1 | N.A. | No CDM |
| 2 | 1, ½ | 1 | (2, 1) | FD-CDM2 |
| 4 | 1 | 1 | (4, 1) | FD-CDM2 |
| 8 | 1 | 1 | (2, 1) | FD-CDM2 |
| 8 | 1 | 2 | (2, 2) | FD-CDM2, CDM4(FD2, TD2) |
| 12 | 1 | 1 | (2, 1) | FD-CDM2 |
| 12 | 1 | 2 | (2, 2) | CDM4(FD2, TD2) |
| 16 | 1, ½ | 2 | (2, 2) | FD-CDM2, CDM4(FD2, TD2) |
| 24 | 1, ½ | 4 | (2, 2) | FD-CDM2, CDM4(FD2, TD2), CDM-8( FD2, TD4) (TD4 on adjacent symbols only) |
| 32 | 1, ½ | 4 | (2, 2) | FD-CDM2, CDM4(FD2, TD2), CDM-8( FD2, TD4) (TD4 on adjacent symbols only) |

Figure 1:
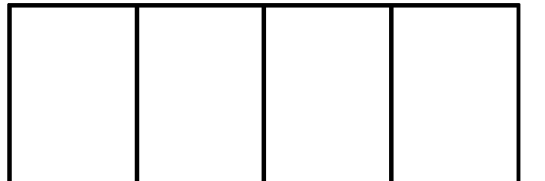
FIG. 1 illustrates resource units for CSI-RS, in accordance with various embodiments.
Figure 1:
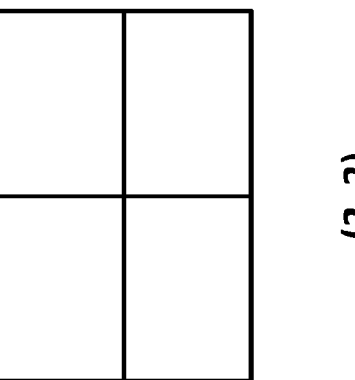
Figure 1:

FIG. 1 illustrates basic units used for construction of a CSI-RS resource. In some embodiments, the resource units may be non-adjacent in the frequency domain. CSI-RS may occupy N=1, 2 or 4 OFDM symbol(s). If multiple symbols are used for CSI-RS transmission, the occupied REs are the same for all used OFDM symbols.

Current NR specification supports three types of CSI-RS transmission: periodic, semipersistent, and aperiodic. Periodic CSI-RS is configured by RRC signaling and periodically transmitted by a gNB. Semi-persistent CSI-RS is also configured by RRC, but its periodic transmission is activated by MAC signaling. Aperiodic CSI-RS is triggered by DCI and limited to one or several CSI-RS transmission occasions. Aperiodic CSI-RS is triggered by UL DCI formats 0_1 and 0_2 in a user equipment (UE)-specific manner.

Accordingly, current specifications only allow CSI-RS to be triggered in a UE-specific manner, and does not support triggering of CSI-RS transmission for multiple UEs.

Various embodiments herein provide techniques for CSI-RS triggering for multiple UEs using a single DCI. In some embodiments, a new radio network temporary identifier (RNTI) may be used to indicate triggering of CSI-RS transmission for multiple UEs. Additionally, or alternatively, a new DCI format may be used that supports CSI-RS triggering for multiple UEs. The techniques described herein may provide reduced DCI overhead compared with prior techniques.

In some embodiments, a new DCI format may be introduced to trigger CSI-RS for multiple UEs. The DCI may provide information to the UE to indicate CSI-RS transmission, provide information on a component carrier (CC) or group of CCs in which CSI-RS is transmitted, and/or indicate other information associated with the CSI-RS such as one or more CSI-RS resources. The new DCI format may support triggering of CSI-RS resources of different types, such as but not limited to CSI-RS with repetition "ON" and "OFF" (e.g., with the same Tx beam and/or different Tx beam), with trs-Info or without corresponding parameters (e.g., for CSI measurements). The new DCI format may also support optional triggering of sounding reference signal (SRS) transmission associated with corresponding CSI-RS resources.

Figure 2:
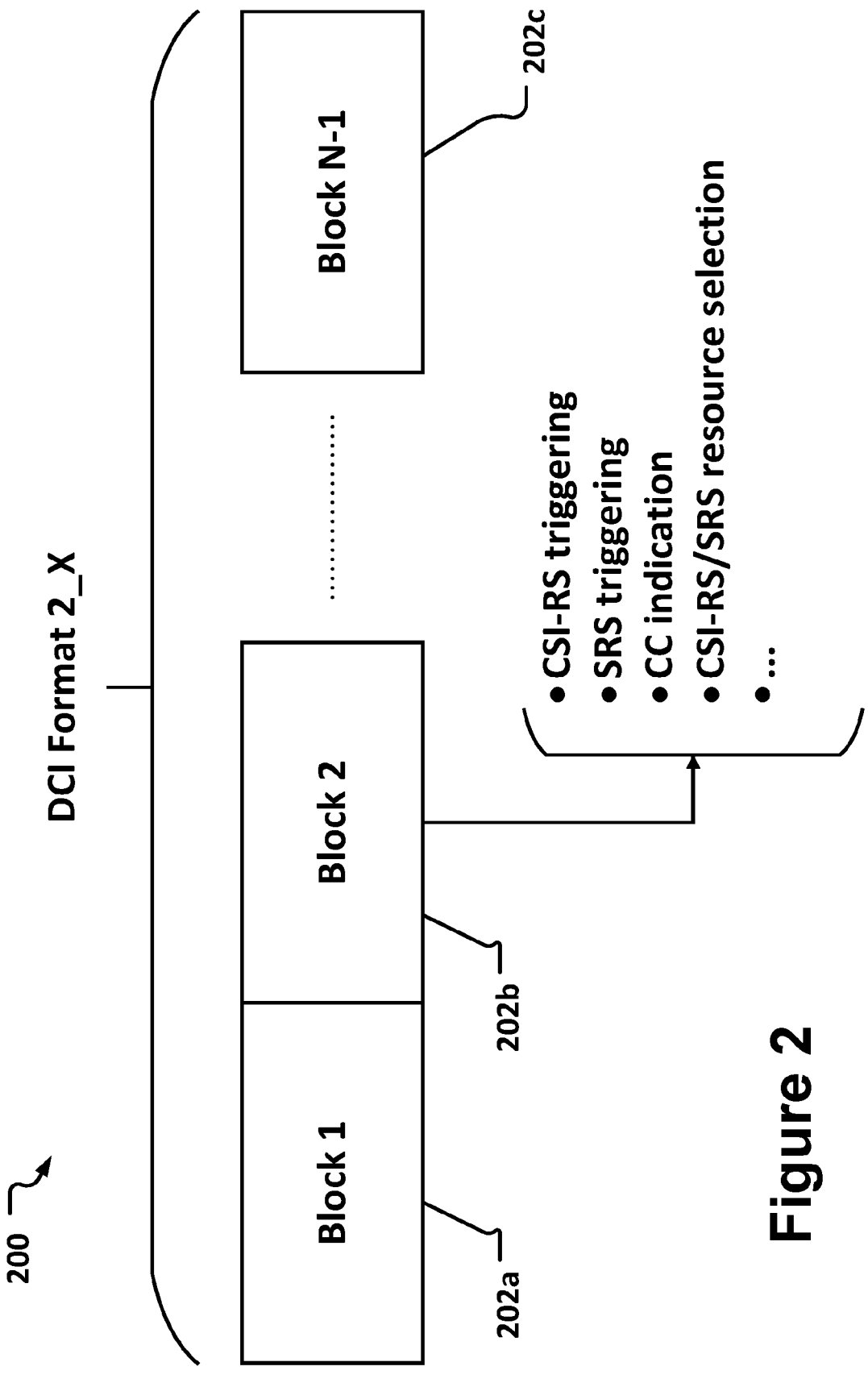
FIG. 2 illustrates a DCI format for CSI-RS triggering for a group of UEs, in accordance with various embodiments.

For example, FIG. 2 illustrates an example DCI format 200 with multiple blocks 202*a-c* of bits. Individual blocks 202*a-c* may correspond to one or more UEs to trigger CSI-RS and/or provide corresponding parameters to the respective one or more UEs. For example, the blocks 202*a-c* may include a triggering codepoint to indicate a corresponding set of parameters.

In embodiments, the UE may receive configuration information from the gNB to assign the UE to one or more blocks 202*a-c* of the DCI format 200. The configuration information may additionally or alternatively indicate one or more CSI-RS parameters associated with the particular block 202*a-c*.

In another embodiment, a new RNTI may be introduced to support CSI-RS triggering for multiple UEs. The new RNTI may be configured for the set of multiple UEs using higher layers (e.g., RRC signaling from the gNB to the UE). The RNTI may be used with the new DCI described herein and/or with existing DCI formats capable of aperiodic CSI-RS triggering, e.g., DCI format 0_2, 0_1 or 0_0. The corresponding DCI with new RNTI may be used with additional restriction on DCI format without UL physical uplink shared channel (PUSCH), e.g. UL-SCH indicator=0). Accordingly, no PUSCH transmission may be scheduled by the DCI.

Systems and Implementations

Figure 3:
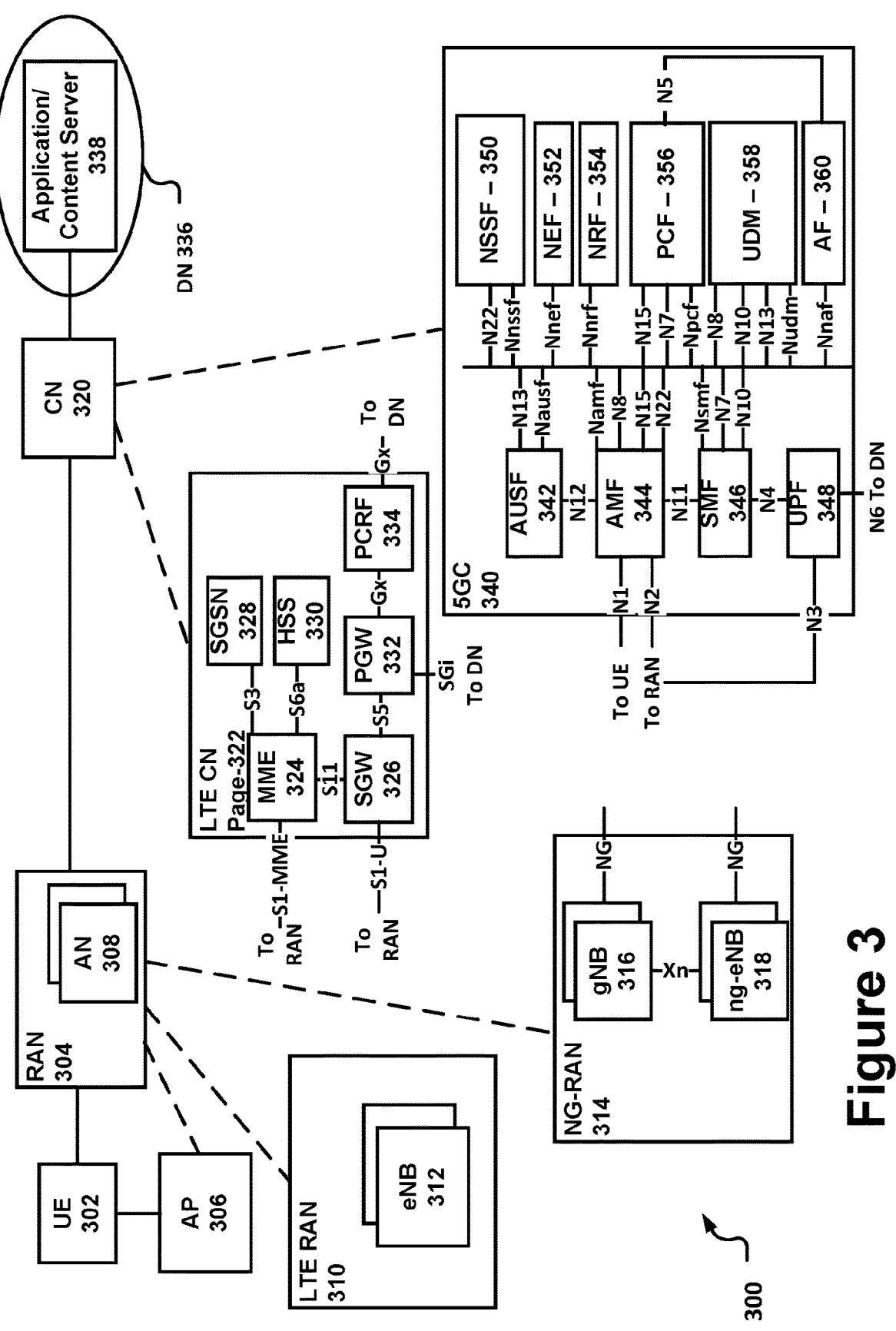
FIG. 3 illustrates a network in accordance with various embodiments.
Figure 4:
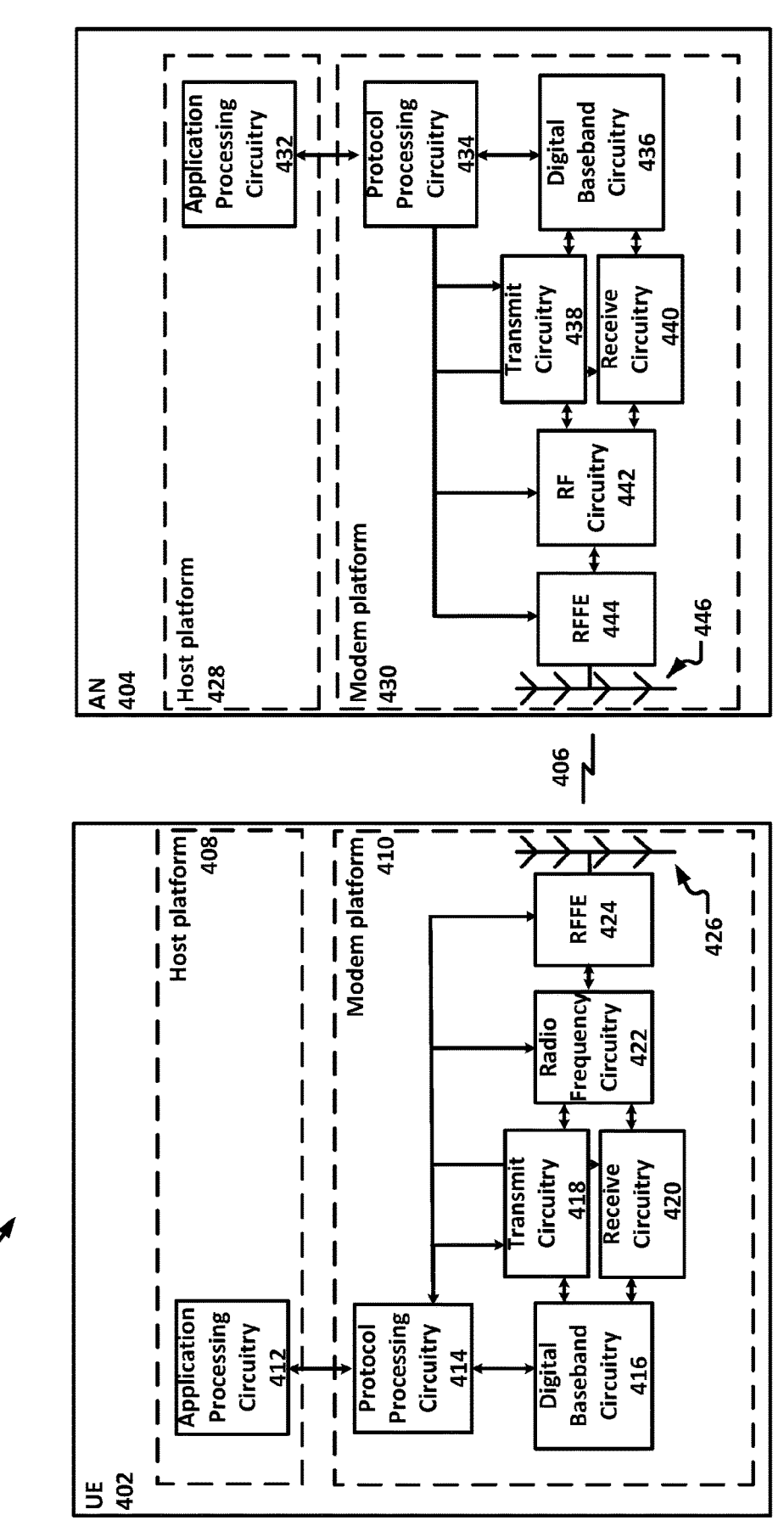
FIG. 4 schematically illustrates a wireless network in accordance with various embodiments.
Figure 5:
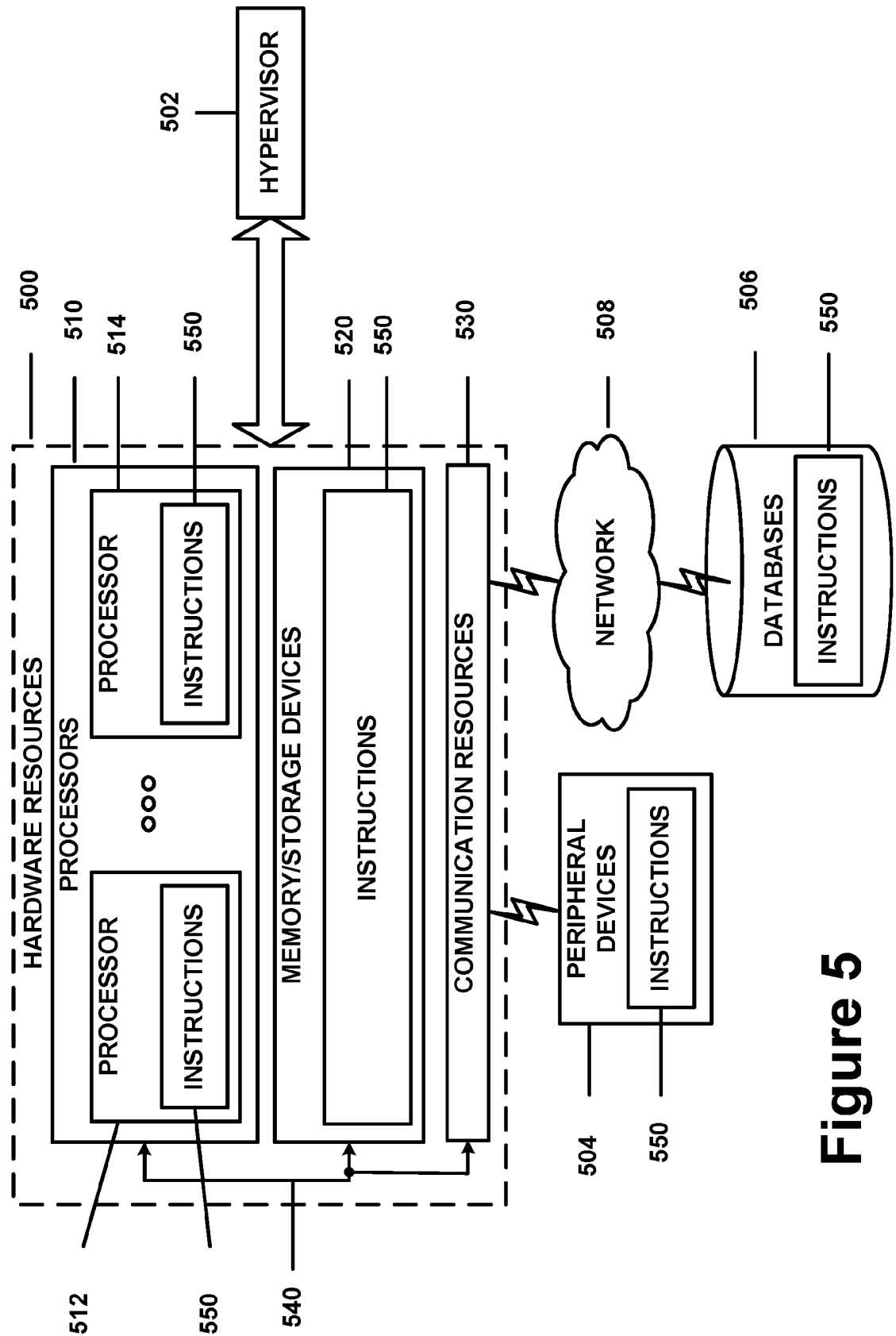
FIG. 5 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 3-5 illustrate various systems, devices, and components that may implement aspects of disclosed embodiments.

FIG. 3 illustrates a network 300 in accordance with various embodiments. The network 300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 300 may include a UE 302, which may include any mobile or non-mobile computing device designed to communicate with a RAN 304 via an over-the-air connection. The UE 302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 302 may additionally communicate with an AP 306 via an over-the-air connection. The AP 306 may manage a WLAN connection, which may serve to offload some/all network traffic from the RAN 304. The connection between the UE 302 and the AP 306 may be consistent with any IEEE 802.11 protocol, wherein the AP 306 could be a wireless fidelity (Wi-Fi®) router. In some embodiments, the UE 302, RAN 304, and AP 306 may utilize cellular-WLAN aggregation (for example, LWA/LWIP). Cellular-WLAN aggregation may involve the UE 302 being configured by the RAN 304 to utilize both cellular radio resources and WLAN resources.

The RAN 304 may include one or more access nodes, for example, AN 308. AN 308 may terminate air-interface protocols for the UE 302 by providing access stratum protocols including RRC, PDCP, RLC, MAC, and L1 protocols. In this manner, the AN 308 may enable data/voice connectivity between CN 320 and the UE 302. In some embodiments, the AN 308 may be implemented in a discrete device or as one or more software entities running on server computers as part of, for example, a virtual network, which may be referred to as a CRAN or virtual baseband unit pool. The AN 308 be referred to as a BS, gNB, RAN node, eNB, ng-eNB, NodeB, RSU, TRxP, TRP, etc. The AN 308 may be a macrocell base station or a low power base station for providing femtocells, picocells or other like cells having smaller coverage areas, smaller user capacity, or higher bandwidth compared to macrocells.

In embodiments in which the RAN 304 includes a plurality of ANs, they may be coupled with one another via an X2 interface (if the RAN 304 is an LTE RAN) or an Xn interface (if the RAN 304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 304 may each manage one or more cells, cell groups, component carriers, etc. to provide the UE 302 with an air interface for network access. The UE 302 may be simultaneously connected with a plurality of cells provided by the same or different ANs of the RAN 304. For example, the UE 302 and RAN 304 may use carrier aggregation to allow the UE 302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 302 or AN 308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU": an eNB may be referred to as an "eNB-type RSU"; a gNB may be referred to as a "gNB-type RSU": and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 304 may be an LTE RAN 310 with eNBs, for example, eNB 312. The LTE RAN 310 may provide an LTE air interface with the following characteristics: SCS of 15 kHz: CP-OFDM waveform for DL and SC-FDMA waveform for UL: turbo codes for data and TBCC for control: etc. The LTE air interface may rely on CSI-RS for CSI acquisition and beam management: PDSCH/PDCCH DMRS for PDSCH/PDCCH demodulation: and CRS for cell search and initial acquisition, channel quality measurements, and channel estimation for coherent demodulation/detection at the UE. The LTE air interface may operating on sub-6 GHz bands.

In some embodiments, the RAN 304 may be an NG-RAN 314 with gNBs, for example, gNB 316, or ng-eNBs, for example, ng-eNB 318. The gNB 316 may connect with 5G-enabled UEs using a 5G NR interface. The gNB 316 may connect with a 5G core through an NG interface, which may include an N2 interface or an N3 interface. The ng-eNB 318 may also connect with the 5G core through an NG interface, but may connect with a UE via an LTE air interface. The gNB 316 and the ng-eNB 318 may connect with each other over an Xn interface.

In some embodiments, the NG interface may be split into two parts, an NG user plane (NG-U) interface, which carries traffic data between the nodes of the NG-RAN 314 and a UPF 348 (e.g., N3 interface), and an NG control plane (NG-C) interface, which is a signaling interface between the nodes of the NG-RAN314 and an AMF 344 (e.g., N2 interface).

The NG-RAN 314 may provide a 5G-NR air interface with the following characteristics: variable SCS: CP-OFDM for DL, CP-OFDM and DFT-s-OFDM for UL: polar, repetition, simplex, and Reed-Muller codes for control and LDPC for data. The 5G-NR air interface may rely on CSI-RS. PDSCH/PDCCH DMRS similar to the LTE air interface. The 5G-NR air interface may not use a CRS, but may use PBCH DMRS for PBCH demodulation: PTRS for phase tracking for PDSCH; and tracking reference signal for time tracking. The 5G-NR air interface may operating on FR1 bands that include sub-6 GHZ bands or FR2 bands that include bands from 24.25 GHZ to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 302 can be configured with multiple BWPs where each BWP configuration has a different SCS. When a BWP change is indicated to the UE 302, the SCS of the transmission is changed as well. Another use case example of BWP is related to power saving. In particular, multiple BWPs can be configured for the UE 302 with different amount of frequency resources (for example, PRBs) to support data transmission under different traffic loading scenarios. A BWP containing a smaller number of PRBs 20 can be used for data transmission with small traffic load while allowing power saving at the UE 302 and in some cases at the gNB 316. A BWP containing a larger number of PRBs can be used for scenarios with higher traffic load.

The RAN 304 is communicatively coupled to CN 320 that includes network elements to provide various functions to support data and telecommunications services to customers/subscribers (for example, users of UE 302). The components of the CN 320 may be implemented in one physical node or separate physical nodes. In some embodiments. NFV may be utilized to virtualize any or all of the functions provided by the network elements of the CN 320 onto physical compute/storage resources in servers, switches, etc. A logical instantiation of the CN 320 may be referred to as a 30) network slice, and a logical instantiation of a portion of the CN 320 may be referred to as a network sub-slice.

In some embodiments, the CN 320 may be an LTE CN 322, which may also be referred to as an EPC. The LTE CN 322 may include MME 324, SGW 326, SGSN 328, HSS 330, PGW 332, and PCRF 334 coupled with one another over interfaces (or "reference points") as shown. Functions of the elements of the LTE CN 322 may be briefly introduced as follows.

The MME 324 may implement mobility management functions to track a current location of the UE 302 to facilitate paging, bearer activation/deactivation, handovers, gateway selection, authentication, etc.

The SGW 326 may terminate an SI interface toward the RAN and route data packets between the RAN and the LTE CN 322. The SGW 326 may be a local mobility anchor point for inter-RAN node handovers and also may provide an anchor for inter-3GPP mobility. Other responsibilities may include lawful intercept, charging, and some policy enforcement.

The SGSN 328 may track a location of the UE 302 and perform security functions and access control. In addition, the SGSN 328 may perform inter-EPC node signaling for mobility between different RAT networks: PDN and S-GW selection as specified by MME 324: MME selection for handovers: etc. The S3 reference point between the MME 324 and the SGSN 328 may enable user and bearer information exchange for inter-3GPP access network mobility in idle/active states.

The HSS 330 may include a database for network users, including subscription-related information to support the network entities handling of communication sessions. The HSS 330 can provide support for routing/roaming, authentication, authorization, naming/addressing resolution, location dependencies, etc. An S6a reference point between the HSS 330 and the MME 324 may enable transfer of subscription and authentication data for authenticating/authorizing user access to the LTE CN 320.

The PGW 332 may terminate an SGi interface toward a data network (DN) 336 that may include an application/content server 338. The PGW 332 may route data packets between the LTE CN 322 and the data network 336. The PGW 332 may be coupled with the SGW 326 by an S5 reference point to facilitate user plane tunneling and tunnel management. The PGW 332 may further include a node for policy enforcement and charging data collection (for example, PCEF). Additionally, the SGi reference point between the PGW 332 and the data network 336 may be an operator external public, a private PDN, or an intra-operator packet data network, for example, for provision of IMS services. The PGW 332 may be coupled with a PCRF 334 via a Gx reference point.

The PCRF 334 is the policy and charging control element of the LTE CN 322. The PCRF 334 may be communicatively coupled to the app/content server 338 to determine appropriate Qos and charging parameters for service flows. The PCRF 332 may provision associated rules into a PCEF (via Gx reference point) with appropriate TFT and QCI.

In some embodiments, the CN 320 may be a 5GC 340. The 5GC 340 may include an AUSF 342, AMF 344, SMF 346, UPF 348, NSSF 350, NEF 352, NRF 354, PCF 356, UDM 358, and AF 360 coupled with one another over interfaces (or "reference points") as shown. Functions of the elements of the 5GC 340 may be briefly introduced as follows.

The AUSF 342 may store data for authentication of UE 302 and handle authentication-related functionality. The AUSF 342 may facilitate a common authentication framework for various access types. In addition to communicating with other elements of the 5GC 340 over reference points as shown, the AUSF 342 may exhibit an Nausf service-based interface.

The AMF 344 may allow other functions of the 5GC 340) to communicate with the UE 302 and the RAN 304 and to subscribe to notifications about mobility events with respect to the UE 302. The AMF 344 may be responsible for registration management (for example, for registering UE 302), connection management, reachability management, mobility management, lawful interception of AMF-related events, and access authentication and authorization. The AMF 344 may provide transport for SM messages between the UE 302 and the SMF 346, and act as a transparent proxy for routing SM messages. AMF 344 may also provide transport for SMS messages between UE 302 and an SMSF. AMF 344 may interact with the AUSF 342 and the UE 302 to perform various security anchor and context management functions. Furthermore. AMF 344 may be a termination point of a RAN CP interface, which may include or be an N2 reference point between the RAN 304 and the AMF 344; and the AMF 344 may be a termination point of NAS (N1) signaling, and perform NAS ciphering and integrity protection. AMF 344 may also support NAS signaling with the UE 302 over an N3 IWF interface.

The SMF 346 may be responsible for SM (for example, session establishment, tunnel management between UPF 348 and AN 308); UE IP address allocation and management (including optional authorization); selection and control of UP function; configuring traffic steering at UPF 348 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 344 over N2 to AN 308; and determining SSC mode of a session. SM may refer to management of a PDU session, and a PDU session or "session" may refer to a PDU connectivity service that provides or enables the exchange of PDUs between the UE 302 and the data network 336.

The UPF 348 may act as an anchor point for intra-RAT and inter-RAT mobility, an external PDU session point of interconnect to data network 336, and a branching point to support multi-homed PDU session. The UPF 348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 348 may include an uplink classifier to support routing traffic flows to a data network.

The NSSF 350 may select a set of network slice instances serving the UE 302. The NSSF 350) may also determine allowed NSSAI and the mapping to the subscribed S-NS-SAIs, if needed. The NSSF 350 may also determine the AMF set to be used to serve the UE 302, or a list of candidate AMFs based on a suitable configuration and possibly by querying the NRF 354. The selection of a set of network slice instances for the UE 302 may be triggered by the AMF 344 with which the UE 302 is registered by interacting with the NSSF 350, which may lead to a change of AMF. The NSSF 350 may interact with the AMF 344 via an N22 reference point: and may communicate with another NSSF in a visited network via an N31 reference point (not shown). Additionally, the NSSF 350 may exhibit an Nnssf service-based interface.

The NEF 352 may securely expose services and capabilities provided by 3GPP network functions for third party, internal exposure/re-exposure. AFs (e.g., AF 360), edge computing or fog computing systems, etc. In such embodiments, the NEF 352 may authenticate, authorize, or throttle the AFs. NEF 352 may also translate information exchanged with the AF 360 and information exchanged with internal network functions. For example, the NEF 352 may translate between an AF-Service-Identifier and an internal 5GC information. NEF 352 may also receive information from other NFs based on exposed capabilities of other NFs. This information may be stored at the NEF 352 as structured data, or at a data storage NF using standardized interfaces. The stored information can then be re-exposed by the NEF 352 to other NFs and AFs, or used for other purposes such as analytics. Additionally, the NEF 352 may exhibit an Nnef service-based interface.

The NRF 354 may support service discovery functions, receive NF discovery requests from NF instances, and provide the information of the discovered NF instances to the NF instances. NRF 354 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 354 may exhibit the Nnrf service-based interface.

The PCF 356 may provide policy rules to control plane functions to enforce them, and may also support unified policy framework to govern network behavior. The PCF 356 may also implement a front end to access subscription information relevant for policy decisions in a UDR of the UDM 358. In addition to communicating with functions over reference points as shown, the PCF 356 exhibit an Npcf service-based interface.

The UDM 358 may handle subscription-related information to support the network entities' handling of communication sessions, and may store subscription data of UE 302. For example, subscription data may be communicated via an N8 reference point between the UDM 358 and the AMF 344. The UDM 358 may include two parts, an application front end and a UDR. The UDR may store subscription data and policy data for the UDM 358 and the PCF 356, and/or structured data for exposure and application data (including PFDs for application detection, application request information for multiple UEs 302) for the NEF 352. The Nudr service-based interface may be exhibited by the UDR 221 to allow the UDM 358, PCF 356, and NEF 352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

The AF 360 may provide application influence on traffic routing, provide access to NEF, and interact with the policy framework for policy control.

In some embodiments, the 5GC 340 may enable edge computing by selecting operator/3$^{rd}$ party services to be geographically close to a point that the UE 302 is attached to the network. This may reduce latency and load on the network. To provide edge-computing implementations, the 5GC 340) may select a UPF 348 close to the UE 302 and execute traffic steering from the UPF 348 to data network 336 via the N6 interface. This may be based on the UE subscription data, UE location, and information provided by the AF 360. In this way, the AF 360 may influence UPF (re)selection and traffic routing. Based on operator deployment, when AF 360 is considered to be a trusted entity, the network operator may permit AF 360 to interact directly with relevant NFs. Additionally, the AF 360 may exhibit an Naf service-based interface.

The data network 336 may represent various network operator services, Internet access, or third party services that may be provided by one or more servers including, for example, application/content server 338.

FIG. 4 schematically illustrates a wireless network 400 in accordance with various embodiments. The wireless network 400 may include a UE 402 in wireless communication with an AN 404. The UE 402 and AN 404 may be similar to, and substantially interchangeable with, like-named components described elsewhere herein.

The UE 402 may be communicatively coupled with the AN 404 via connection 406. The connection 406 is illustrated as an air interface to enable communicative coupling, and can be consistent with cellular communications protocols such as an LTE protocol or a 5G NR protocol operating at mmWave or sub-6 GHZ frequencies.

The UE 402 may include a host platform 408 coupled with a modem platform 410. The host platform 408 may include application processing circuitry 412, which may be coupled with protocol processing circuitry 414 of the modem platform 410. The application processing circuitry 412 may run various applications for the UE 402 that source/sink application data. The application processing circuitry 412 may further implement one or more layer operations to transmit/receive application data to/from a data network. These layer operations may include transport (for example UDP) and Internet (for example, IP) operations The protocol processing circuitry 414 may implement one or more of layer operations to facilitate transmission or reception of data over the connection 406. The layer operations implemented by the protocol processing circuitry 414 may include, for example, MAC, RLC, PDCP, RRC and NAS operations.

The modem platform 410 may further include digital baseband circuitry 416 that may implement one or more layer operations that are "below" layer operations performed by the protocol processing circuitry 414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 410 may further include transmit circuitry 418, receive circuitry 420, RF circuitry 422, and RF front end (RFFE) 424, which may include or connect to one or more antenna panels 426. Briefly, the transmit circuitry 418 may include a digital-to-analog converter, mixer, intermediate frequency (IF) components, etc.; the receive circuitry 420 may include an analog-to-digital converter, mixer, IF components, etc.; the RF circuitry 422 may include a low-noise amplifier, a power amplifier, power tracking components, etc.; RFFE 424 may include filters (for example, surface/bulk acoustic wave filters), switches, antenna tuners, beamforming 30) components (for example, phase-array antenna components), etc. The selection and arrangement of the components of the transmit circuitry 418, receive circuitry 420, RF circuitry 422, RFFE 424, and antenna panels 426 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 414 may include one or more instances of control circuitry (not shown) to provide control functions for the transmit/receive components.

A UE reception may be established by and via the antenna panels 426, RFFE 424, RF circuitry 422, receive circuitry 420, digital baseband circuitry 416, and protocol processing circuitry 414. In some embodiments, the antenna panels 426 may receive a transmission from the AN 404 by receive-beamforming signals received by a plurality of antennas/antenna elements of the one or more antenna panels 426.

A UE transmission may be established by and via the protocol processing circuitry 414, digital baseband circuitry 416, transmit circuitry 418, RF circuitry 422, RFFE 424, and antenna panels 426. In some embodiments, the transmit components of the UE 404 may apply a spatial filter to the data to be transmitted to form a transmit beam emitted by the antenna elements of the antenna panels 426.

Similar to the UE 402, the AN 404 may include a host platform 428 coupled with a modem platform 430. The host platform 428 may include application processing circuitry 432 coupled with protocol processing circuitry 434 of the modem platform 430. The modem platform may further include digital baseband circuitry 436, transmit circuitry 438, receive circuitry 440, RF circuitry 442, RFFE circuitry 444, and antenna panels 446. The components of the AN 404 may be similar to and substantially interchangeable with like-named components of the UE 402. In addition to performing data transmission/reception as described above, the components of the AN 408 may perform various logical functions that include, for example, RNC functions such as radio bearer management, uplink and downlink dynamic radio resource management, and data packet scheduling.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540 or other interface circuitry. For embodiments where node virtualization (e.g., NFV) is utilized, a hypervisor 502 may be executed to provide an execution environment for one or more network slices/subslices to utilize the hardware resources 500.

The processors 510 may include, for example, a processor 512 and a processor 514. The processors 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface controllers, components, or other suitable devices to communicate with one or more peripheral devices 504 or one or more databases 506 or other network elements via a network 508. For example, the communication resources 530 may include wired communication components (e.g., for coupling via USB, Ethernet, etc.), cellular communication components, NFC components, Bluetooth®: (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the 25 peripheral devices 504 or the databases 506. Accordingly, the memory of processors 510, the memory/storage devices 520, the peripheral devices 504, and the databases 506 are examples of computer-readable and machine-readable media.

EXAMPLE PROCEDURES

Figure 6:
FIG. 6 depicts an example procedure for practicing the various embodiments discussed herein.
Figure 6:
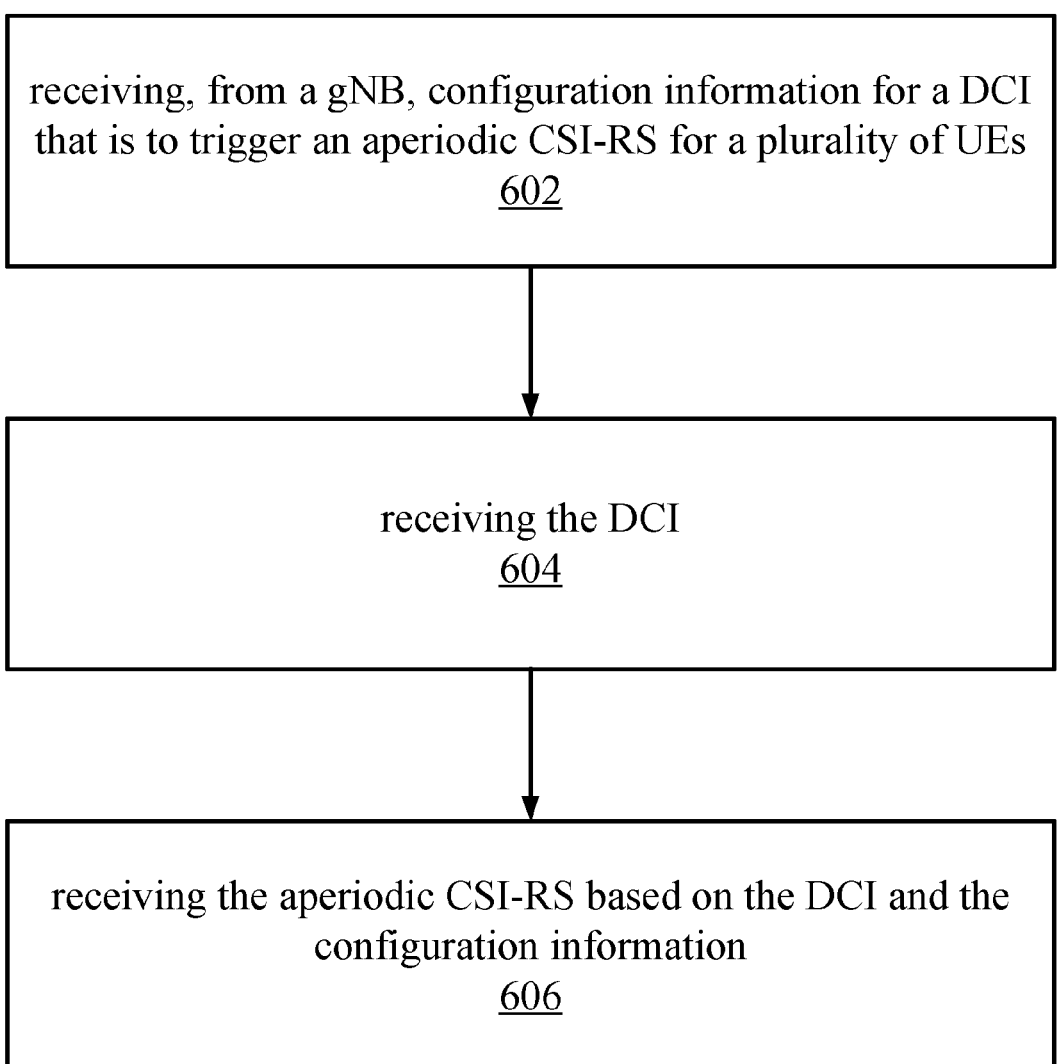

In some embodiments, the electronic device(s), network(s), system(s), chip(s) or component(s), or portions or implementations thereof, of FIGS. 3-5, or some other figure herein, may be configured to perform one or more processes, techniques, or methods as described herein, or portions thereof. For example, FIG. 6 illustrates a process 600 in accordance with some embodiments. The process 600 may be performed by a UE or a portion thereof.

At 602, the process 600 may include receiving, from a gNB, configuration information for a DCI that is to trigger an aperiodic CSI-RS for a plurality of UEs. At 604, the process 600 may further include receiving the DCI. At 606, the process 600 may further include receiving the aperiodic CSI-RS based on the DCI and the configuration information.

In some embodiments, the DCI may include a plurality of blocks of bits to trigger respective aperiodic CSI-RSs for respective groups of one or more UEs. The configuration information may indicate one or more of the plurality of blocks of bits to which the UE is assigned. Additionally, or alternatively, the DCI may include a RNTI to trigger the aperiodic CSI-RS for the plurality of UEs. The configuration information may configure the RNTI.

FIG. 7 illustrates another process 700 in accordance with various embodiments, the process 700 may include, at 702, encoding, for transmission to a plurality of UEs, a DCI to trigger one or more aperiodic CSI-RSs for the plurality of UEs. At 704, the process 700 may further include encoding the one or more aperiodic CSI-RS for transmission based on the DCI.

In some embodiments, the gNB may transmit configuration information for the DCI to the plurality of UEs. In some embodiments, the DCI may include a plurality of blocks of bits to trigger respective aperiodic CSI-RSs for respective groups of one or more UEs. The configuration information may indicate one or more of the plurality of blocks of bits to which the UE is assigned. Additionally, or alternatively, the DCI may include a RNTI to trigger the aperiodic CSI-RS for the plurality of UEs. The configuration information may configure the RNTI.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include one or more non-transitory computer-readable media (NTCRM) having instructions, stored thereon, that when executed by one or more processors cause a user equipment (UE) to: receive, from a next generation Node B (gNB), configuration information for a downlink control information (DCI) that is to trigger an aperiodic channel state information (CSI)-reference signal (RS) for a plurality of UEs; receive the DCI; and receive the aperiodic CSI-RS based on the DCI and the configuration information.

Example 2 may include the one or more NTCRM of Example 1, wherein the aperiodic CSI-RS is a first aperiodic CSI-RS, wherein the DCI includes a plurality of blocks of bits to trigger respective aperiodic CSI-RSs including the first aperiodic CSI-RS, and wherein the configuration information indicates a first block, of the plurality of blocks of bits, to which the UE is assigned.

Example 3 may include the one or more NTCRM of Example 2, wherein the first block indicates a triggered CSI-RS resource associated with the first aperiodic CSI-RS.

Example 4 may include the one or more NTCRM of Example 3, wherein the triggered CSI-RS resource is a CSI-RS resource set for CSI-RS repetitions or tracking reference signal information (trs-info).

Example 5 may include the one or more NTCRM of Example 2, wherein the first block indicates a component carrier on which the first aperiodic CSI-RS is to be transmitted.

Example 6 may include the one or more NTCRM of Example 2, wherein the first block further includes information for a sounding reference signal (SRS) associated with the first CSI-RS, and wherein the instructions, when executed, are further to cause the UE to encode the SRS for transmission based on the information.

Example 7 may include the one or more NTCRM of any of Examples 1-6, wherein the configuration information is to configure a radio network temporary identifier (RNTI) that is used to trigger the aperiodic CSI-RS for the plurality of UEs.

Example 8 may include the one or more NTCRM of Example 7, wherein the DCI has a DCI format 0_1 or a DCI format 0_2.

Example 9 may include the one or more NTCRM of Example 7, wherein the DCI includes a uplink (UL)-shared channel (SCH) indicator that indicates no physical uplink shared channel (PUSCH) transmission is scheduled by the DCI.

Example 10 may include one or more non-transitory computer-readable media (NTCRM) having instructions, stored thereon, that when executed by one or more processors cause a next generation Node B (gNB) to: encode, for transmission to a plurality of user equipments (UEs), a downlink control information (DCI) to trigger one or more aperiodic channel state information (CSI)-reference signals (RSs) for the plurality of UEs: and encode the one or more aperiodic CSI-RS for transmission based on the DCI.

Example 11 may include the one or more NTCRM of Example 10, wherein the one or more aperiodic CSI-RS is a plurality of aperiodic CSI-RSs, wherein the DCI includes a plurality of blocks of bits to trigger the respective aperiodic CSI-RSs.

Example 12 may include the one or more NTCRM of Example 11, wherein the instructions, when executed, are further to cause the gNB to encode, for transmission to the plurality of UEs, configuration information to assign the plurality of UEs to respective blocks of the plurality of blocks of bits.

Example 13 may include the one or more NTCRM of Example 11, wherein individual blocks of the plurality of blocks of bits indicate at least one of a CSI-RS resource or a component carrier associated with the respective aperiodic CSI-RS.

Example 14 may include the one or more NTCRM of Example 13, wherein the individual blocks include the CSI-RS resource, and wherein the CSI-RS resource is a CSI-RS resource set for CSI-RS repetitions or tracking reference signal information (trs-info).

Example 15 may include the one or more NTCRM of Example 11, wherein one or more of the blocks of bits includes information for a sounding reference signal (SRS) associated with the corresponding aperiodic CSI-RS.

Example 16 may include the one or more NTCRM of any of Examples 10-15, wherein the DCI includes a radio network temporary identifier (RNTI) that is used to trigger the aperiodic CSI-RS for the plurality of UEs.

Example 17 may include the one or more NTCRM of Example 16, wherein the DCI has a DCI format 0_1 or a DCI format 0_2.

Example 18 may include the one or more NTCRM of Example 16, wherein the DCI includes a uplink (UL)-shared channel (SCH) indicator that indicates no physical uplink shared channel (PUSCH) transmission is scheduled by the DCI.

Example 19 may include an apparatus to be implemented in a user equipment (UE), the apparatus comprising processor circuitry to: receive, from a next generation Node B (gNB), configuration information for a downlink control information (DCI) that includes a plurality of blocks of bits to trigger respective aperiodic channel state information (CSI)-reference signals (RSs) for respective groups of one or more UEs, wherein the configuration information indicates a first block, of the plurality of blocks of bits, to which the UE is assigned: receive the DCI to 25 trigger a first aperiodic CSI-RS: and receive the first aperiodic CSI-RS based on the first block of the DCI. The processor circuitry may further include a memory to store an identifier of the first block.

Example 20 may include the apparatus of Example 19, wherein the first block indicates at least one of a CSI-RS resource or a component carrier associated with the first aperiodic CSI-RS.

Example 21 may include the apparatus of Example 19, wherein the first block further includes information for a sounding reference signal (SRS) associated with the first CSI-RS, and wherein the processor circuitry is further to encode the SRS for transmission based on the information.

Example 22 may include the apparatus of any of Examples 19-21, wherein the configuration information is to configure a radio network temporary identifier (RNTI) that is used to trigger the first aperiodic CSI-RS for multiple UEs of the plurality of UEs.

Example 23 may include an apparatus comprising means to perform one or more elements of a method described in or related to any of examples 1-22, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 25 may include an apparatus comprising logic, modules, or circuitry to perform one or more elements of a method described in or related to any of examples 1-22, or any other method or process described herein.

Example 26 may include a method, technique, or process as described in or related to any of examples 1-22, or portions or parts thereof.

Example 27 may include an apparatus comprising: one or more processors and one or more computer-readable media comprising instructions that, when executed by the one or more processors, cause the one or more processors to perform the method, techniques, or process as described in or related to any of examples 1-22, or portions thereof.

Example 28 may include a signal as described in or related to any of examples 1-22, or portions or parts thereof.

Example 29 may include a datagram, packet, frame, segment, protocol data unit (PDU), or message as described in or related to any of examples 1-22, or portions or parts thereof, or otherwise described in the present disclosure.

Example 30 may include a signal encoded with data as described in or related to any of examples 1-22, or portions or parts thereof, or otherwise described in the present disclosure.

Example 31 may include a signal encoded with a datagram, packet, frame, segment, protocol data unit (PDU), or message as described in or related to any of examples 1-22, or portions or parts thereof, or otherwise described in the present disclosure.

Example 32 may include an electromagnetic signal carrying computer-readable instructions, wherein execution of the computer-readable instructions by one or more processors is to cause the one or more processors to perform the method, techniques, or process as described in or related to any of examples 1-22, or portions thereof.

Example 33 may include a computer program comprising instructions, wherein execution of the program by a processing element is to cause the processing element to carry out the method, techniques, or process as described in or related to any of examples 1-22, or portions thereof.

Example 34 may include a signal in a wireless network as shown and described herein.

Example 35 may include a method of communicating in a wireless network as shown and described herein.

Example 36 may include a system for providing wireless communication as shown and described herein.

Example 37 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

TERMINOLOGY

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry." may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry." and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment"

or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation: otherwise, the term "Special Cell" refers to the Pcell.

The invention claimed is:

1. One or more non-transitory computer-readable media (NTCRM) having instructions, stored thereon, that when executed by one or more processors cause a user equipment (UE) to:

receive, from a next generation Node B (gNB), configuration information for a downlink control information (DCI) that is to trigger an aperiodic channel state information (CSI)-reference signal (RS) for a plurality of UEs;

receive the DCI, wherein the DCI includes a plurality of blocks of bits to trigger respective aperiodic CSI-RSs for respective groups of UEs, and wherein the configuration information assigns the UE to a specific block of the plurality of blocks of bits; and receive the aperiodic CSI-RS based on the specific block of the DCI and the configuration information.

2. The one or more NTCRM of claim 1, wherein the aperiodic CSI-RS is a first aperiodic CSI-RS, wherein the DCI includes a plurality of blocks of bits to trigger respective aperiodic CSI-RSs including the first aperiodic CSI-RS, and wherein the configuration information indicates a first block, of the plurality of blocks of bits, to which the UE is assigned.

3. The one or more NTCRM of claim 2, wherein the first block indicates a triggered CSI-RS resource associated with the first aperiodic CSI-RS.

4. The one or more NTCRM of claim 3, wherein the triggered CSI-RS resource is a CSI-RS resource set for CSI-RS repetitions or tracking reference signal information (trs-info).

5. The one or more NTCRM of claim 2, wherein the first block indicates a component carrier on which the first aperiodic CSI-RS is to be transmitted.

6. The one or more NTCRM of claim 2, wherein the first block further includes information for a sounding reference signal (SRS) associated with the first CSI-RS, and wherein the instructions, when executed, are further to cause the UE to encode the SRS for transmission based on the information.

7. The one or more NTCRM of claim 6, wherein the configuration information is to configure a radio network temporary identifier (RNTI) that is used to trigger the aperiodic CSI-RS for the plurality of UEs.

8. The one or more NTCRM of claim 7, wherein the DCI has a DCI format 0_1 or a DCI format 0_2, and wherein the DCI includes a uplink (UL)-shared channel (SCH) indicator that indicates no physical uplink shared channel (PUSCH) transmission is scheduled by the DCI.

9. One or more non-transitory computer-readable media (NTCRM) having instructions, stored thereon, that when executed by one or more processors cause a next generation Node B (gNB) to:

encode, for transmission to a plurality of user equipments (UEs), a downlink control information (DCI) to trigger one or more aperiodic channel state information (CSI)-reference signals (RSs) for the plurality of UEs, wherein the DCI includes a plurality of blocks of bits to trigger respective aperiodic CSI-RSs for respective groups of UEs; and encode the one or more aperiodic CSI-RS for transmission based on the DCI.

10. The one or more NTCRM of claim 9, wherein the one or more aperiodic CSI-RS is a plurality of aperiodic CSI-RSs, wherein the DCI includes a plurality of blocks of bits to trigger the respective aperiodic CSI-RSs.

11. The one or more NTCRM of claim 10, wherein the instructions, when executed, are further to cause the gNB to encode, for transmission to the plurality of UEs, configuration information to assign the plurality of UEs to respective blocks of the plurality of blocks of bits.

12. The one or more NTCRM of claim 10, wherein individual blocks of the plurality of blocks of bits indicate at least one of a CSI-RS resource or a component carrier associated with the respective aperiodic CSI-RS.

13. The one or more NTCRM of claim 12, wherein the individual blocks include the CSI-RS resource, and wherein the CSI-RS resource is a CSI-RS resource set for CSI-RS repetitions or tracking reference signal information (trs-info).

14. The one or more NTCRM of claim 10, wherein one or more of the blocks of bits includes information for a sounding reference signal (SRS) associated with the corresponding aperiodic CSI-RS.

15. The one or more NTCRM of claim 9, wherein the DCI includes a radio network temporary identifier (RNTI) that is used to trigger the aperiodic CSI-RS for the plurality of UEs.

16. The one or more NTCRM of claim 15, wherein the DCI has a DCI format 0_1 or a DCI format 0_2, and wherein the DCI includes a uplink (UL)-shared channel (SCH) indicator that indicates no physical uplink shared channel (PUSCH) transmission is scheduled by the DCI.

17. An apparatus to be implemented in a user equipment (UE), the apparatus comprising:

processor circuitry to:

receive, from a next generation Node B (gNB), configuration information for a downlink control information (DCI) that includes a plurality of blocks of bits to trigger respective aperiodic channel state information (CSI)-reference signals (RSs) for respective groups of one or more UEs, wherein the configuration information assigns the UE to a first block, of the plurality of blocks of bits;

receive the DCI to trigger a first aperiodic CSI-RS; and receive the first aperiodic CSI-RS based on the assigned first block of the DCI; and a memory to store an identifier of the first block.

18. The apparatus of claim 17, wherein the first block indicates at least one of a CSI-RS resource or a component carrier associated with the first aperiodic CSI-RS.

19. The apparatus of claim 17, wherein the first block further includes information for a sounding reference signal (SRS) associated with the first aperiodic CSI-RS, and wherein the processor circuitry is further to encode the SRS for transmission based on the information.

20. The apparatus of claim 17, wherein the configuration information is to configure a radio network temporary identifier (RNTI) that is used to trigger the first aperiodic CSI-RS for multiple UEs of the plurality of UEs.

* * * * *